United States Patent Office 3,736,222
Patented May 29, 1973

3,736,222
CERAMIC ARTICLES AND METHOD OF SEALING CERAMICS
Ronald H. Arendt, Schenectady, N.Y., assignor to General Electric Company, Schenectady, N.Y.
No Drawing. Filed Apr. 28, 1971, Ser. No. 138,306
Int. Cl. C04b 35/10, 37/00, 39/00
U.S. Cl. 161—182                 10 Claims

ABSTRACT OF THE DISCLOSURE

A method of forming a seal between high-density alumina bodies is provided. The method involves placing an $Al_2O_3$-$Ga_2O_3$ mixture between the bodies to be sealed and heating the mixture to a temperature above the melting point of $Ga_2O_3$ and below the deformation temperature of the bodies such that a solid solution of $Al_2O_3$-$Ga_2O_3$ forms as a seal between the alumina bodies. Ceramic articles having a gas tight seal are made by the method.

---

High-density polycrystalline translucent alumina ceramics have been of considerable interest especially in the production of electrical discharge devices and lamps. R. L. Coble, U.S. Pat. No. 3,026,210 describes this material and a basic method of preparing it. The polycrystalline alumina bodies disclosed in the Coble patent consists of at least 99.5 percent alumina and are very dense, having essentially no porosity. For this reason, the material is well-suited for use in the manufacture of lamp envelopes. Also, envelopes constructed from high-density polycrystalline alumina withstand attack by alkali metal vapors at high operating temperatures and pressures and can, therefore, be used in the manufacture of lamps such as sodium and cesium vapor lamps. In order to construct a practical and useful lamp it is necessary to tightly seal the structure.

Heretofore, R. J. Charles et al., U.S. Pat. No. 3,545,639 disclosed a glass bonding composition consisting essentially of barium oxide, magnesium oxide, calcium oxide and alumina for bonding high-density alumina bodies to bodies of the same composition or to bond refractory metal seals to the alumina bodies. The composition is one which undergoes a peritectic decomposition during cooling and rapidly crystallizes at a eutectic producing an extremely fine-grained ceramic seal.

In according with the present invention, I have discovered a method of forming a seal between high-density alumina bodies by placing between the portions o fthe bodies to be sealed an aqueous slurry comprising an inorganic mixture consisting essentially of $Ga_2O_3$ and $Al_2O_3$ and an organic binder, drying the aqueous slurry, firing the composite bodies at a temperature above the melting point of $Ga_2O_3$ and below the deformation temperature of the alumina bodies whereby the organic binder is removed and at least a portion of the inorganic mixture initially forms a liquid phase that is transformed to a solid solution of $Ga_2O_3$-$Al_2O_3$ at the interface between said bodies, and cooling the sealed bodies. I have found that the novel high-density alumina sealed with a $Ga_2O_3$-$Al_2O_3$ composition by the above-described process produce a gas tight seal.

Initially, the substantially pure (99%) materials $Ga_2O_3$ and $Al_2O_3$ in fine particulate form are dry mixed. However it is permissible for the $GaO_3$ to contain small amounts of $Al_2O_3$ as an impurity since this may act as a source of the $Al_2O_3$ and does not affect the final seal. A phase diagram for the system $Al_2O_3$-$Ga_2O_3$ by Hill et al., J. Am. Ceram. Soc., 35 [6] 136 (1952) indicates that at temperatures above the melting point of $\beta$-$Ga_2O_3$ (about 1,740° C.) a liquid phase exists. In the present process, the $Ga_2O_3$ and/or $Al_2O_3$-$Ga_2O_3$ in the liquid phase act to chemically dissolve a portion of surface of the alumina bodies to be bonded and in addition to fill the space between the alumina bodies sealed and any void spaces between undissolved alumina aggregates in the sealing composition. It has been found that the minimum amount of $Ga_2O_3$ present should be about 20 mole percent. The upper limit of the $Ga_2O_3$ content may be almost completely $Ga_2O_3$ but, in order to form a solid solution, this is considered impractical since the $Al_2O_3$ required for the seal would have to be supplied entirely by the alumina bodies to be sealed. Thus, for practical purposes the upper limit of $Ga_2O_3$ should be about 60 mole percent. The $Al_2O_3$ in the sealing composition should be a finely particulated form such that it has a high surface area and can readily be dissolved to form a liquid and finally a solid solution with the $Ga_2O_3$. An excess of $Al_2O_3$ may be present and this can act as a separate aggregate phase in the seal, but again for practical reasons and to permit the liquid phase to fill the voids the maximum amount of $Al_2O_3$ is considered to be about 80 mole percent. While there need be almost no $Al_2O_3$ present initially and most of the $Al_2O_3$ for the solid solution may be supplied by the alumina bodies to be sealed, it is desirable to have about 40 mole percent $Al_2O_3$ present to limit the amount dissolved and to permit the formation of a seal within a reasonable period of time.

The inorganic mixture is applied between high-density alumina bodies (which may be polycrystalline or a single crystal material, e.g. sapphire) using a procedure similar to that of applying solder sealing glasses as described by E. B. Shand, Glass Engineering Handbook, second edition (1958), pages 127–128. Thus, the $Ga_2O_3$ and $Al_2O_3$ mixture can be suspended in a volatile liquid, preferably water, to form a slurry of the desired consistency. Organic binders, such as polyvinyl alcohol and polyimides, are usually added to the slurry, and a firing is required to ensure that the binder is eliminated. This mixture may be applied to the surfaces being sealed by coating, spraying or flowing. After the coating has been applied, the volatile liquid is removed by drying the slurry.

The composite body is now fired to form a liquid phase of at least a portion of the inorganic mixture, that is subsequently transformed to a solid solution of $Ga_2O_3$-$Al_2O_3$, at the interface between the alumina bodies. As shown in the phase diagram of Hill et al., the firing temperature must be above the melting point of $Ga_2O_3$ in order to form a liquid phase. Upon subsequent heating, the $Ga_2O_3$ acts to dissolve or react with the $Al_2O_3$ to form a solid solution. At the same time, the temperature should not exceed the deformation point of the alumina bodies to be sealed. The preferred temperature is in the range of about 1,750–1,850° C. At these temperatures the $Al_3O_3$ will dissolve in the liquid phase until a solid solution is formed. During solidification it is postulated that a graded seal is formed at the interface between alumina bodies and the sealing composition since as the alumina is dissolved the area adjacent to the alumina surface is richer in $Al_2O_3$. While the firing time is not critical, it is recommended that at the preferred temperatures the time be about 5–120 minutes. Subsequently, the sealed composite is cooled to room temperature. It was observed that a gas tight seal is formed.

My invention is further illustrated by the following examples:

EXAMPLE I

An inorganic mixture of 1.7613 grams of alumina and 3.2418 grams of gallia, was prepared to give approximately a 50–50 molar composition. The powdered oxides were dry mixed overnight in a polyethylene container to form a homogeneous mixture. To this mixture was added an aqueous solution containing 2% by weight of polyvinyl alcohol such that a viscous slurry was formed. The slurry was then applied between a polycrystalline alumina cylinder and a polycrystalline alumina disk to form a coating between the two bodies. Thereafter the slurry was air-dried.

The composite material was placed in a molybdenum element furnace and fired in a hydrogen atmosphere at a temperature of between 1,750° to 1,850° C. for various periods of time ranging from 5 minutes to 2 hours. The heating rate was in excess of 2,000° C. per hour. The composite body was then rapidly cooled to room temperature.

The sealed alumina composite article was found to be leaktight to gaseous helium. Microstructural analysis of the sealing area indicated that the bond was a crystalline solid solution of gallia and alumina containing aggregate particles of alumina embedded in the gallia-alumina solid solution bond. The portion adjacent to the alumina bodies indicated that the sealing composition had wetted and dissolved a portion of the alumina bodies. Attempts to separate the two bodies indicated that a very strong bond had been formed between them.

EXAMPLES II–IV

Following the procedure of Example I, the ratio of alumina to gallia in the inorganic mixture was varied as shown in the table below:

TABLE

| | EXAMPLE | | |
|---|---|---|---|
| | II | III | IV |
| Ingredient (g.): | | | |
| $Ga_2O_3$ | 2.752 | 2.205 | 1.577 |
| $Al_2O_3$ | 2.245 | 2.800 | 3.425 |
| Molar ratio: $Al_2O_3$:$Ga_2O_3$ | 60:40 | 70:30 | 80:20 |

Slurries of these mixtures were also placed between two alumina bodies and fired under the same conditions as described in Example I.

The bonds obtained using each of these slurries was substantially identical in strength and in structure to those previously obtained and a vacuum tight seal was obtained in each instance.

It will be appreciated that the invention is not limited to the specific details shown in the examples and illustrations and that various modifications may be made within the ordinary skill in the art without departing from the spirit and scope of the invention.

I claim:
1. A method of forming a seal between high-density alumina bodies, said method comprising the steps of
    (a) placing between the portions of said bodies to be sealed a coating of a slurry comprising an inorganic oxide portion consisting essentially of 20–60 mole percent $Ga_2O_3$ and 40–80 mole percent $Al_2O_2$ and a liquid phase,
    (b) drying the slurry to remove the liquid phase,
    (c) firing the coated bodies at a temperature above the melting point of $Ga_2O_3$ and below the deformation temperatures of said bodies such that a $Al_2O_3O$-$Ga_2O_3$ solid solution is formed, and
    (d) cooling the sealed bodies.
2. The method of claim 1, wherein said slurry is aqueous and contains an organic binder.
3. The method of claim 1, wherein the firing temperature is from 1,750–1,850° C.
4. The method of claim 3, wherein the firing time is from 5–120 minutes.
5. The method of claim 1, wherein said alumina bodies are polycrystalline and consist essentially of at least 99.5 percent by weight of $Al_2O_3$.
6. A seal between high-density alumina bodies consisting essentially of 20–60 mole percent $Ga_2O_3$ and 40–80 mole percent $Al_2O_3$.
7. The seal of claim 6, wherein said alumina bodies are polycrystalline and consist essentially of at least 99.5% by weight of $Al_2O_3$.
8. A ceramic article comprising high-density alumina bodies and a gas tight seal between said bodies, the seal consisting essentially of 20–60 mole percent $Ga_2O_3$ and 40–80 mole percent $Al_2O_3$.
9. The article of claim 7, wherein said alumina bodies are polycrystalline and consist essentially of 99.5 percent by weight of $Al_2O_3$.
10. The method of claim 4, wherein the inorganic portion consists essentially of about 50 mole percent gallium oxide and 50 mole percent of alumina.

References Cited
UNITED STATES PATENTS

| 3,281,309 | 10/1966 | Ross | 161—196 |
| 3,208,892 | 9/1965 | Miller et al. | 156—89 |
| 3,385,463 | 5/1968 | Lange | 220—2.3 |
| 3,469,729 | 9/1969 | Grekila et al. | 156—89 |
| 3,243,635 | 3/1966 | Louden et al. | 156—89 |
| 3,545,639 | 12/1970 | Charles et al. | 106—39 DV |
| 3,026,210 | 3/1962 | Coble | 106—62 |

DANIEL J. FRITSCH, Primary Examiner

U.S. Cl. X.R.

106—65; 156—89; 161—192; 220—2.1 R